Figure 1:
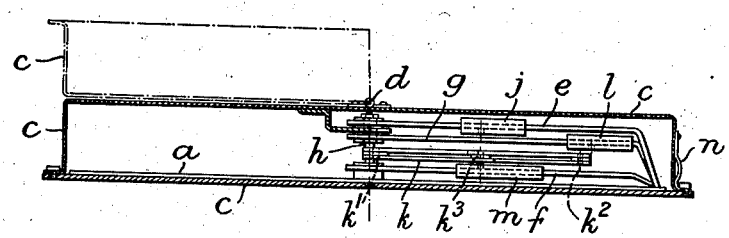

Aug. 6, 1929.  H. ADDISON ET AL  1,723,757
COURSE AND DISTANCE INDICATOR
Filed Sept. 15, 1926

Inventors
H. Addison and
W. B. Luard
by Toulmin & Toulmin
Attys.

Patented Aug. 6, 1929.

1,723,757

UNITED STATES PATENT OFFICE.

HERBERT ADDISON, OF WORTHING, AND WILLIAM BLAINE LUARD, OF FALMOUTH, ENGLAND.

COURSE AND DISTANCE INDICATOR.

Application filed September 15, 1926, Serial No. 135,688, and in Great Britain September 15, 1925.

This invention relates to apparatus for the mechanical solution of certain trigonometrical problems.

The primary object of this invention is to provide a course indicator for surface or submarine or aerial vessels, but it can be applied to the solution of other similarly conditioned problems involving relative velocities or forces, or in general to the solution of any problems in which, having been given either three sides or two sides and one angle, or one side and two angles of a triangle, it is desired to find the remaining sides or angles, the indicator being of the type comprising a graduated circular card and three graduated arms that can be set in accordance with the vector quantities.

According to this invention the three arms are each pivoted at the centre of the card, and each carries a cursor or slide. Instead of being mechanically connected to a pivot located at the centre of the card the arms, or any of them, may be otherwise constrained to move round the centre of the card; for instance by means of an arcuate saddle or the like part coinciding with an arc of, and constrained to move along, the circumference of a circle described from said centre, to which saddle the arm is rigidly secured so as to coincide with a radius of the circle. Alternatively, the operative arms may be mounted on the outer ends of other arms which are themselves pivoted at the centre of the card.

The relative position of the three arms is determined by means of a pantagraph or like lever system of which the three main pivots are attached to the three cursors respectively.

For the purpose of elucidating the invention it will be hereinafter described with reference to the mechanical solution of the "triangle of velocities" which is the basis of all course indicators for ships. The usual problem in this case is to determine what course must be steered by a ship through the water in order that she may proceed along a given course over the ground, and to determine this it is necessary to know the speed of the vessel through the water and the speed and direction of the water current.

The three arms, which will hereinafter be referred to respectively as the current arm, the course arm, and the resultant arm, represent directly (1) the direction of flow of the medium through which the body travels, (2) the direction of travel of the body relatively to the earth, (3) the direction of travel of the body relatively to the medium. The positions of the three cursors represent directly respectively (1) the speed of the medium, (2) the absolute speed of the body, (3) the speed of the body relatively to the medium.

Figure 2:
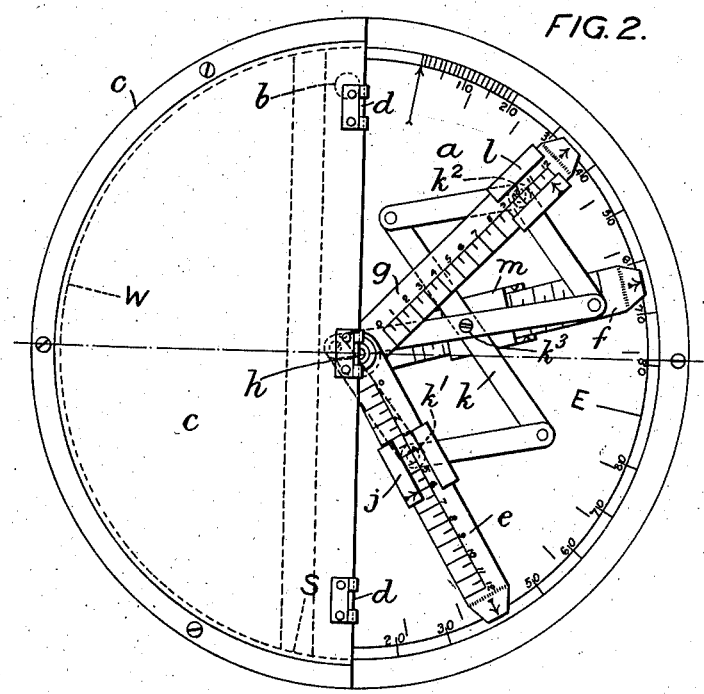

One form of construction of the invention is illustrated in the annexed drawings, in which Fig. 1 is a side elevation, the pivoted arms being in this case substantially in the same plane, and certain parts being omitted;

Fig. 2 is a plan view.

In these drawings, $a$ is a card divided into 360 degrees at its outer edge, and held as by means of a screw $b$ in a casing $c$, preferably formed of brass, and hinged centrally as shown at $d$. There are provided three arms $e$, $f$, $g$, each of which is pivoted at the centre of the card $a$ as shown at $h$, the arms being displaceable in a rotary direction. Of these arms, the arm $e$ is the current arm, and is provided with a slide or cursor $j$ to which is secured one outside pivot $k'$ of a link lever system $k$ in the form of a pantagraph. The arm $g$ is the course arm, and is also provided with a cursor $l$, to which is attached the other outside pivot $k^2$ of the lever system $k$.

The central pivot $k^3$ of the lever system is connected to a cursor $m$ on the resultant arm $f$, or is radially slidably connected with said arm $f$, as by means of a pin and slot connection. A spring clip $n$ serves to hold the apparatus in its folded position.

If the cursors on the course and current arms $g$ and $e$ are set respectively to the speed of the ship through the water and the speed of the current and the current arm $e$ and resultant arm $f$ are turned respectively to the points on the card corresponding with the set of the current and the desired course over the ground, the course arm $g$ will then indicate the course to be steered through the water in order that the ship should proceed along the desired course over the ground. Moreover, the position of the central pivot of the pantagraph along the resultant arm $f$ will be a measure of the speed made good in the desired direction. To give direct readings of the speed made good, the graduations of the speed scale on the resultant arm $f$ should be on half the scale of those of the speed scales on the course and current arms *g* and *e*.

If it be desired to show the speed made good on the same scale as the other speeds, this may be done by the introduction of a second pantagraph having one of its outside pivots co-incident with the common pivot of the three radial arms and its central pivot coincident with the central pivot of the resultant arm. The other outside pivot of the second pantagraph will move along the resultant arm and its position thereon will indicate the speed made good on the same scale as the positions of the cursors on the course and current arms indicate the course speed through the water and the current speed.

While the ordinary pantagraph is the most convenient extensible link for connecting the cursors on two of the three radial arms with the third radial arm, any equivalent extensible link may be substituted therefor, and other modifications may be made in the apparatus without affecting the principle thereof or exceeding the scope of the invention.

What we claim and desire to secure by Letters Patent is:—

1. Apparatus for the mechanical solution of vector triangles, comprising in combination a graduated circular base, three graduated arms each movable around the centre of the card, a cursor movable along each arm, and interconnections between the three cursors whereby each arm is caused to represent directly the direction, and the position of the cursor on the arm the magnitude, of the corresponding vector.

2. Apparatus for the mechanical solution of vector triangles, comprising in combination a graduated circular base, three graduated radially extending arms each movable around the centre of the card as a pivot, a cursor movable along each arm, a pivot on each cursor, and an extensible link connecting the three pivots on the cursors so that said pivots are located on a straight line and the two outer pivots are equidistant from the middle pivot in all positions of the arms.

3. Apparatus for the mechanical solution of vector triangles, comprising in combination a graduated circular base, three graduated arms each movable around the centre of the card, a cursor movable along each arm, and a pantagraph lever system connecting the three cursors.

4. A course and distance indicator for aircraft, comprising in combination a graduated circular base, at least three graduated arms each movable around the center of the base, a cursor movable along each arm, and link connections between the three cursors such that the position of one arm directly indicates the course of the craft through the air, the position of the cursor on that arm the speed of the craft relatively to the air on the said course, the position of another arm directly indicates the course of the craft relatively to the ground, the position of the cursor on this arm the speed of the craft relatively to the ground, the position of the third arm directly indicates the direction of the wind, and the cursor on this arm the velocity of the wind.

5. A navigating instrument for sea-craft comprising in combination a graduated circular base, three graduated arms each movable around the centre of the card, a cursor movable on each arm, and pantagraph lever interconnections between the three cursors such that the position of each arm represents directly the direction, and that of the cursor on the arm the magnitude, of the appropriate vector, the three arms representing course steered, course made good, and direction of current, and the three cursors representing speed of the craft, speed made good, and speed of current.

In testimony whereof we affix our signatures.

HERBERT ADDISON.
WILLIAM BLAINE LUARD.